United States Patent
Tang et al.

(10) Patent No.: US 12,049,554 B2
(45) Date of Patent: Jul. 30, 2024

(54) ETHYLENE PROPYLENE DIENE MONOMER (EPDM) AND VINYL NORBORNENE DIENE (VNB) COPOLYMERS AND METHODS OF MAKING SAME

(71) Applicant: Lion Copolymer Geismar, LLC, Geismar, LA (US)

(72) Inventors: Solomon H. K. Tang, Geismar, LA (US); Alrica L. J. Payne, Geismar, LA (US); Willie Charles Burton, Geismar, LA (US); Michael Durousseau, Geismar, LA (US)

(73) Assignee: Lion Copolymers Geismar, LLC, Geismar, LA (US)

( * ) Notice: Subject to any disclaimer, the term of this patent is extended or adjusted under 35 U.S.C. 154(b) by 0 days.

(21) Appl. No.: 17/975,261

(22) Filed: Oct. 27, 2022

(65) Prior Publication Data
US 2023/0138702 A1    May 4, 2023

Related U.S. Application Data

(60) Provisional application No. 63/273,299, filed on Oct. 29, 2021.

(51) Int. Cl.
*C08F 210/18* (2006.01)
*C08F 236/20* (2006.01)
*C08L 23/16* (2006.01)

(52) U.S. Cl.
CPC ............ *C08L 23/16* (2013.01); *C08F 210/18* (2013.01); *C08F 236/20* (2013.01); *C08F 2800/20* (2013.01); *C08L 2314/02* (2013.01); *C08L 2314/06* (2013.01)

(58) Field of Classification Search
CPC ...... C08F 210/18; C08F 2500/17; C08F 2/38; C08F 2500/27; C08L 23/16; C08L 236/20
See application file for complete search history.

(56) References Cited

U.S. PATENT DOCUMENTS

| | | | | |
|---|---|---|---|---|
| 7,605,217 | B2 * | 10/2009 | Datta | D01F 6/46 |
| | | | | 525/331.7 |
| 8,101,254 | B2 * | 1/2012 | Noguchi | C08K 5/09 |
| | | | | 525/232 |
| 8,530,550 | B2 * | 9/2013 | Sannomiya | C08K 3/36 |
| | | | | 524/265 |
| 10,336,845 | B2 * | 7/2019 | Tsou | C08K 3/013 |
| 10,882,981 | B2 * | 1/2021 | Blok | C08L 7/00 |
| 10,894,841 | B2 * | 1/2021 | Canich | C08F 210/16 |

(Continued)

FOREIGN PATENT DOCUMENTS

WO    WO 2015/118912 A1 *    8/2015    ............. B32B 15/06

OTHER PUBLICATIONS

WO 2015/118912 A1 (Aug. 13, 2015); machine translation. (Year: 2015).*

*Primary Examiner* — Rip A Lee
(74) *Attorney, Agent, or Firm* — Kean Miller LLP; Robert Devin Ricci; Brian J. Servé

(57) ABSTRACT

Disclosed herein are EPDM-VNB copolymers that have a low molecular weight and are liquid at room temperature. The copolymers include: ethylene, propylene, and vinyl norbornene, where the copolymers have a molecular weight from about 2,500 g/mol to about 1,000,000 g/mol, and where the copolymers have a viscosity from about 1,000 cP to about 2,500,000 cP at 100° C.

16 Claims, 3 Drawing Sheets

(56) References Cited

U.S. PATENT DOCUMENTS

| | | | |
|---|---|---|---|
| 11,053,381 B2* | 7/2021 | Dharmarajan | C08F 210/06 |
| 11,732,121 B2* | 8/2023 | Loyd | C08L 23/0815 |
| | | | 525/240 |
| 2009/0234073 A1* | 9/2009 | Matsui | C09K 3/10 |
| | | | 526/89 |
| 2022/0267649 A1* | 8/2022 | Coffey | C08L 7/00 |
| 2023/0250268 A1* | 8/2023 | Loyd | B32B 25/042 |
| | | | 428/35.7 |

* cited by examiner

ETHYLENE PROPYLENE DIENE MONOMER (EPDM) AND VINYL NORBORNENE DIENE (VNB) COPOLYMERS AND METHODS OF MAKING SAME

CROSS-REFERENCE TO RELATED APPLICATIONS

This application claims benefit of priority under 35 U.S.C. § 119(e) of U.S. Ser. No. 63/273,299, filed Oct. 29, 2021, the entire contents of which is incorporated herein by reference in its entirety.

BACKGROUND

Field

Provided herein are ethylene, propylene, and vinyl norbornene copolymers, which have low molecular weights and are in a liquid phase at room temperature.

Description of the Related Art

The polymer industry is constantly investigating new polymers for commercial applications. Ethylene propylene diene monomer (EPDM) is a synthetic polymer/rubber that has a wide range of applications due to its durability and flexibility. Generally, EPDM polymers focus on high molecular weight EPDM polymers; however, high molecular weight EPDM polymers are solid at room temperature, which limits their application in certain commercial products, such as coatings, adhesives, liquid injection molding, and additive manufacturing. Low molecular weight EPDM polymers have been created to fill some of these needs. For example, TRILENE® by LION ELASTOMERS® is a class of specialty lower molecular weight EPDM polymers that are available in liquid or free-flow powder form. TRILENE® liquid EPDM polymers are used in gear oils and greases, caulks, adhesives, roof coatings, high hardness compounds, reactive plasticizers and many other applications that require a low molecular weight liquid EPDM product having some of the characteristics of conventional EPDM. However, no high molecular weight EPDM polymers have been produced with high vinyl norbornene content (being greater than 3.0% mass) because of the high branching propensity of the vinyl norbornene monomer causes the polymer to form gel particles during the polymerization process.

Consequently, there is a need for new ethylene, propylene, and vinyl norbornene copolymer compositions, which have low molecular weight and are liquids at low temperatures.

SUMMARY

Disclosed herein are EPDM-VNB copolymers that have low molecular weights and are liquid at lower temperatures, such as room temperature. In one specific embodiment, the copolymer includes: ethylene; propylene; and vinyl norbornene, where the copolymer has a weight average molecular weight from about 2,500 g/mol to about 1,000,000 g/mol, and where the copolymer has a viscosity from about 1,000 cP to about 2,500,000 cP at 100° C.

In another specific embodiment, the method of making the copolymer can include: adding a solvent to a reactor; adding a propylene and a catalyst mixture to the solvent in the reactor to make a first reaction mixture, wherein the catalyst mixture comprises: one or more catalysts, one or more cocatalysts, and one or more catalyst reactivators; contacting an ethylene to the first reaction mixture to make a second reaction mixture; and contacting a vinyl norbornene to the second reaction mixture to make a copolymer, wherein the copolymer has a molecular weight from about 2,500 g/mol to about 1,000,000 g/mol, and wherein the copolymer has a viscosity from about 1,000 cP to about 2,500,000 cP at 100° C.

BRIEF DESCRIPTION OF THE DRAWINGS

The present disclosure can be better understood by referring to the following drawings. The drawings constitute a part of this specification and include exemplary embodiments of the EPDM-VNB copolymers, which may be embodied in various forms.

DETAILED DESCRIPTION

Figure 1:
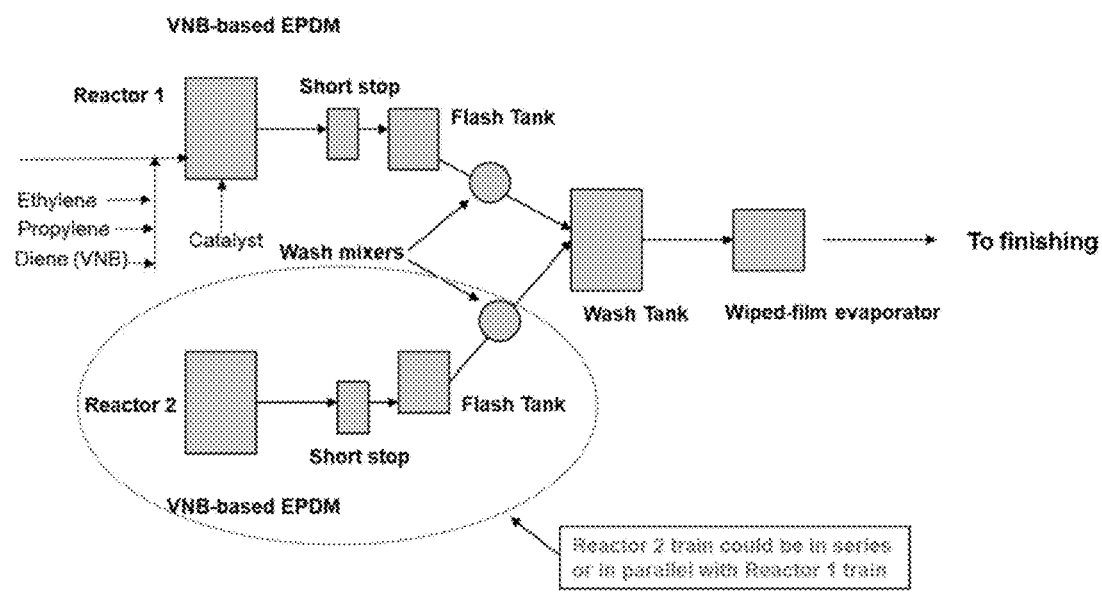
FIG. 1 is a flow diagram of an embodiment for making liquid EPDM-VNB copolymers.

In one or more embodiments, the EPDM-VNB copolymers can include, but are not limited to: one or more ethylenes, one or more propylenes, one or more vinyl norbornene monomers, one or more EPDM polymers, one or more EPDM rubbers, one or more diene copolymers, one or more catalysts, one or more cocatalysts, one or more catalyst reactivators, one or more solvents, one or more hydrogens, one or more additives, and mixtures thereof. In an embodiment, the EPDM-VNB copolymers can include, but are not limited to: a copolymer, a block copolymer, a terpolymer, and mixtures thereof.

The EPDM-VNB copolymer can have a weight-average molecular weight ($M_w$) that varies widely. For example, the EPDM-VNB copolymer can have a weight-average molecular weight from a low of about 10,000 g/mol, about 35,000 g/mol, or about 40,000 g/mol, to a high of about 800,000 g/mol, about 900,000 g/mol, or about 1,200,000 g/mol. In another example, the EPDM-VNB copolymer can have a weight-average molecular weight that is less than 80,000 g/mol, less than 60,000 g/mol, or less than 50,000 g/mol. In another example, the EPDM-VNB copolymer can have a weight-average molecular weight from about 8,000 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The molecular weight of the EPDM-VNB copolymer can measured by gel permeation chromatography with tri-detectors.

The EPDM-VNB copolymer can have a number-average molecular weight (Mc) that varies widely. For example, the EPDM-VNB copolymer can have a number-average molecular weight from a low of about 1,100 g/mol, about 35,000 g/mol, or about 40,000 g/mol, to a high of about 800,000 g/mol, about 900,000 g/mol, or about 1,200,000 g/mol. In another example, the EPDM-VNB copolymer can have a number-average molecular weight that is less than 80,000 g/mol, less than 60,000 g/mol, or less than 50,000 g/mol. In another example, the EPDM-VNB copolymer can have a number-average molecular weight from about 1,100 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The EPDM-VNB copolymer can have a higher-average molecular weight ($M_z$) that varies widely. For example, the EPDM-VNB copolymer can have a higher-average molecular weight from a low of about 10,000 g/mol, about 35,000 g/mol, or about 40,000 g/mol, to a high of about 800,000 g/mol, about 900,000 g/mol, or about 1,200,000 g/mol. In another example, the EPDM-VNB copolymer can have a number-average molecular weight that is less than 80,000 g/mol, less than 60,000 g/mol, or less than 50,000 g/mol. In another example, the EPDM-VNB copolymer can have a higher-average molecular weight from about 8,000 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The EPDM-VNB copolymer can have a molecular weight of the highest peak ($M_p$) that varies widely. For example, the EPDM-VNB copolymer can have a molecular weight of the highest peak from a low of about 10,000 g/mol, about 35,000 g/mol, or about 40,000 g/mol, to a high of about 800,000 g/mol, about 900,000 g/mol, or about 1,200,000 g/mol. In another example, the EPDM-VNB copolymer can have a molecular weight of the highest peak that is less than 80,000 g/mol, less than 60,000 g/mol, or less than 50,000 g/mol. In another example, the EPDM-VNB copolymer can have a molecular weight of the highest peak from about 8,000 g/mol to about 250,000 g/mol, about 30,000 g/mol to about 1,200,000 g/mol, about 20,000 g/mol to about 80,000 g/mol, about 40,000 g/mol to about 80,000 g/mol, about 100,000 g/mol to about 750,000 g/mol, about 480,000 g/mol to about 1,100,000 g/mol, about 500,000 g/mol to about 1,000,000 g/mol.

The EPDM-VNB copolymer can have a polydispersity index (PDI) and/or molecular weight distribution ($M_w/M_n$) from a low of about 2.1, about 4.0, or about 5.0, to a high of about 6.0, about 7.0, or about 28. For example, the EPDM-VNB copolymer can have a polydispersity index and/or molecular weight distribution from about 2.1 to about 8.6, about 3.0 to about 9.0, about 2.9 to about 7.8, about 5.0 to about 6.0, about 5.9 to about 6.2, or about 4.0 to about 7.0, about 12.3 to about 22.5, or about 2.3 to about 24.5.

The EPDM-VNB copolymer can have a content of the one or more ethylenes that can vary widely. For example, the EPDM-VNB copolymer can have an ethylene content from a low of about 0 wt. %, about 5 wt. %, or about 30 wt. %, to a high of about 70 wt. %, about 80 wt. %, or about 95 wt. %. In another example, the EPDM-VNB copolymer can have an ethylene content of at least 45 wt. %, at least 50 wt. %, or at least 55 wt. %. In another example, the EPDM-VNB copolymer can have an ethylene content of the vinyl norbornene polymers from about 5 wt. % to about 95 wt. %, about 25 wt. % to about 75 wt. %, about 20 wt. % to about 80 wt. %, about 69 wt. % to about 75 wt. %, about 68 wt. % to about 82 wt. %, about 72 wt. % to about 86 wt. %, about 50 wt. % to about 73 wt. %, about 33 wt. % to about 48 wt. %, about 60 wt. % to about 70 wt. %, about 71 wt. % to about 81 wt. %, about 20 wt. % to 30 wt. %, about 50 wt. % to about 60 wt. %, or about 70 wt. % to about 80 wt. %. The weight percent of the ethylene in the EPDM-VNB copolymer can be based on the total weight of the EPDM-VNB copolymer; or based on the total weight of the one or more ethylenes, the one or more propylenes, one or more vinyl norbornene, and one or more additives.

The EPDM-VNB copolymer can have a content of the one or more propylenes that can vary widely. For example, the EPDM-VNB copolymer can have a propylene content from a low of about 0 wt. %, about 5 wt. %, or about 30 wt. %, to a high of about 70 wt. %, about 80 wt. %, or about 95 wt. %. In another example, the EPDM-VNB copolymer can have a propylene content of the vinyl norbornene polymers from about 5 wt. % to about 95 wt. %, about 25 wt. % to about 75 wt. %, about 20 wt. % to about 80 wt. %, about 69 wt. % to about 75 wt. %, about 68 wt. % to about 82 wt. %, about 72 wt. % to about 86 wt. %, about 50 wt. % to about 73 wt. %, about 33 wt. % to about 48 wt. %, about 60 wt. % to about 70 wt. %, about 71 wt. % to about 81 wt. %, about 20 wt. % to 30 wt. %, about 50 wt. % to about 60 wt. %, or about 70 wt. % to about 80 wt. %. The weight percent of the propylene in the EPDM-VNB copolymer can be based on the total weight of the EPDM-VNB copolymer; or based on the total weight of the one or more ethylenes, the one or more propylenes, the one or more vinyl norbornene, and one or more additives.

The EPDM-VNB copolymer can have a content of the one or more vinyl norbornene that can vary widely. For example, the EPDM-VNB copolymer can have a vinyl norbornene content from a low of about 0 wt. %, about 5 wt. %, or about 30 wt. %, to a high of about 70 wt. %, about 80 wt. %, or about 95 wt. %. In another example, the EPDM-VNB copolymer can have a vinyl norbornene content of at least 2 wt. %, at least 3 wt. %, or at least 8 wt. %. In another example, the EPDM-VNB copolymer can have a vinyl norbornene content from about 5 wt. % to about 95 wt. %, about 25 wt. % to about 75 wt. %, about 20 wt. % to about 80 wt. %, about 69 wt. % to about 75 wt. %, about 68 wt. % to about 82 wt. %, about 72 wt. % to about 86 wt. %, about 50 wt. % to about 73 wt. %, about 33 wt. % to about 48 wt. %, about 60 wt. % to about 70 wt. %, about 71 wt. % to about 81 wt. %, about 20 wt. % to 30 wt. %, about 50 wt. % to about 60 wt. %, or about 70 wt. % to about 80 wt. %. The weight percent of the vinyl norbornene in the EPDM-VNB copolymer can be based on the total weight of the EPDM-VNB copolymer; or based on the total weight of the one or more ethylenes, the one or more propylenes, one or more vinyl norbornene, and one or more additives.

The EPDM-VNB copolymer can have an ethylene:propylene (E:P) ratio that varies widely. For example, the EPDM-VNB copolymer can have an ethylene/propylene ratio can be 10:90, 20:80, 30:70, 40:60, 50:50; 60:40, 63:37, 70:30, 80:20, and 90:10. In another example, the EPDM-VNB copolymer can have an ethylene/propylene ratio between 40:60 and 80:20, 30:70 and 40:60, or 30:70 and 50:50.

The EPDM-VNB copolymer can have a viscosity that varies widely. For example, the EPDM-VNB copolymer can have a viscosity from a low of about 1 cP, about 1,000 cP, or about 100,000 cP, to a high of about 250,000 cP, about 900,000 cP, or about 2,500,000 cP. In another example, the EPDM-VNB copolymer can have a viscosity from about 1 cP to about 2,500,000 cP, about 100 cP to about 2,000,000 cP, about 100 cP to about 10,000 cP, about 10,000 cP to about 100,000 cP, about 1,000 cP to about 250,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the EPDM-VNB copolymer can be measured on a Brookfield viscosimeter. The viscosity of the EPDM-VNB copolymer can be measured at various temperatures, such as 25° C., 40° C., 60° C., and 100° C.

The EPDM-VNB copolymer can have a solids content that varies widely. For example, the EPDM-VNB copolymer can have a solids content from a low of about 1 wt. %, about 10 wt. %, or about 30 wt. %, to a high of about 70 wt. %, about 80 wt. %, or about 95 wt. %. In another example, the EPDM-VNB copolymer can have a solids content greater than about 50 wt. %, about 55 wt. %, or about 70 wt. %. In another example, the EPDM-VNB copolymer can have a solids content from about 1 wt. % to about 95 wt. %, about 5 wt. % to about 12 wt. %, about 7 wt. % to about 20 wt. %, about 45 wt. % to about 55 wt. %, about 47 wt. % to about 54 wt. %, about 30 wt. % to about 54 wt. %, about 33 wt. % to about 48 wt. %, about 51 wt. % to about 54 wt. %, or about 50 wt. % to about 60 wt. %. The weight percent of the solids content of EPDM-VNB copolymer can be based on the total weight of the EPDM-VNB copolymer; or based on the total weight of the one or more ethylenes, the one or more propylenes, one or more vinyl norbornene, and one or more additives.

The EPDM-VNB copolymer can have a glass transition temperature ($T_g$) that varies widely. For example, the EPDM-VNB copolymer can have a glass transition temperature from a low of about −60° C., about −50° C., or about −40° C., to a high of about −10° C., about −5° C., or about 0° C. In another example, the EPDM-VNB copolymer can have a glass transition temperature from about −60° C. to about 0° C., about −55° C. to about −45° C., about −45° C. to about −35° C., or −26° C. to about −1° C.

The one or more solvents for the first reaction mixture, second reaction mixture, and catalyst mixture can include, but are not limited to: aliphatic hydrocarbons, such as hexanes; aromatic hydrocarbons, such as toluene and benzene; water; deionized water; methanol; ethanol; propanol; isopropanol; acetone; acetonitrile; chloroform; diethyl ether; methylene chloride; dimethyl formamide; ethylene glycol; propylene glycol; triethylamine; tetrahydrofuran; and mixtures thereof. In an embodiment, the solvent can provide a carrier for the ethylene, propylene, vinyl norbornene, catalyst, cocatalyst, and/or catalyst reactivator with a flow rate to a reactor.

The one or more ethylenes can include, but are not limited to: an ethylene monomer, ethylene polymer, and mixtures thereof. The ethylene can be provided in various forms. For example, the ethylene can be provided as a solution of the ethylene and a solvent.

The one or more propylenes can include, but are not limited to: a propylene monomer, propylene polymer, and mixtures thereof. The propylene can be provided in various forms. For example, the propylene can be provided as a solution of propylene and a solvent.

The one or more vinyl norbornenes can include, but are not limited to: a vinyl norbornene monomers, vinyl norbornene polymers, and mixtures thereof. The vinyl norbornene can be provided in various forms. For example, the vinyl norbornene can be provided as a solution of the vinyl norbornene and a solvent.

The one or more hydrogens can include, but are not limited to: hydrogen, diatomic hydrogen, hydrogen gas, and mixtures thereof. The hydrogen can be provided in various forms. For example, the hydrogen can be provided as a gas with a flow rate to a reactor.

The one or more catalysts can include, but are not limited to: a first catalyst, a second catalyst, a third catalyst, and more catalysts. The one or more catalysts can include, but are not limited to: a Ziegler-Natta catalyst, vanadium oxytrichloride ($VOCl_3$), metallocene bis(indenyl) zirconium dichloride, ethylene bis(indenyl) zirconium dichloride (Eurecene 5036), and methylphenylbis(cyclopentadienyl) zirconium dichloride, other metallocenes, and mixtures thereof. The catalyst can be provided in various forms. For example, the catalyst can be provided as a solution of the catalyst and a solvent. In an embodiment, the catalyst selection can assist with forming different ethylene:propylene ratios and VNB content in the EPDM-VNB copolymer. For example, the metallocene can be used in lower molecular weight EPDM-VNB copolymer formation with a flow rate to a reactor.

The one or more cocatalysts can include, but are not limited to: a first cocatalyst, a second cocatalyst, a third cocatalyst, and more cocatalysts. The one or more cocatalysts can include, but are not limited to: triisobutyl aluminum (TIBA); N,N-dimethylanilinium tetrakis(pentafluorophenyl) borate; ethyl aluminum sesqui chloride; methylaluminoxane (MAO); and mixtures thereof. The cocatalyst can be provided in various forms. For example, the cocatalyst can be provided as a solution of cocatalyst and a solvent with a flow rate to a reactor.

The one or more catalyst reactivators can include, but are not limited to: a first catalyst reactivator, a second catalyst reactivator, a third catalyst reactivator, and more catalyst reactivators. The one or more catalyst reactivators can include, but are not limited to: monochlorophenylacetic acid ethyl ester (MCPAE), dichlorophenylacetic acid ethyl ester (DCPAE), and mixtures thereof. The catalyst can be provided in various forms. For example, the catalyst reactivators can be provided as a solution of the catalyst reactivators and a solvent with a flow rate to a reactor.

The one or more additives can include, but are not limited to: one or more catalysts, one or more cocatalysts, one or more catalyst reactivators, one or more curing agents, one or more acids, one or more bases, one or more buffers, one or more wetting agents, one or more surfactants, one or more pigments, one or more opacifying agents, one or more anti-foam agents, one or more antioxidant stabilizers, one or more tackifier agents, water, and mixtures thereof. The additive can be provided in various forms. For example, the additive can be provided as a solution of the additive and a solvent with a flow rate to a reactor. The one or more curing agents can include, but are not limited to: one or more amines and 2,2'-(4-methylphenylimino)diethanol. The one or more tackifier agents can include, but is not limited to, a rosin ester, a hydrocarbon, rosin acid, terpene, modified terpene, coumarone-indene, or mixtures thereof. Commercially available tackifiers can include, but are not limited to, TACOLYN® 3400 and TACOLYN® 1070 by Hercules, Inc.

The EPDM-VNB copolymer can have a content of the one or more additives that can vary widely. For example, the EPDM-VNB copolymer can have a content of the one or more additives from a low of about 0.1 wt. %, about 0.5 wt. %, or about 1 wt. %, to a high of about 50 wt. %, about 70 wt. %, or about 90 wt. %. In another example, the EPDM-VNB copolymer can have content of the one or more additives from about 0.1 wt. % to about 90 wt. %, 0 wt. % to about 10 wt. %, 0.5 wt. % to about 10 wt. %, about 2 wt. % to about 20 wt. %, about 5 wt. % to about 60 wt. %, about 15 wt. % to about 25 wt. %, about 17 wt. % to about 54 wt. %, about 19 wt. % to about 27 wt. %, about 15 wt. % to about 27 wt. %, about 14 wt. % to about 24 wt. %, about 11 wt. % to about 28 wt. %, about 33 wt. % to about 48 wt. %, about 51 wt. % to about 54 wt. %, or about 50 wt. % to about 60 wt. %. The weight percent of the based on the total weight of the EPDM-VNB copolymer, or based on the total weight of the one or more ethylene, the one or more propylene, one or more vinyl norbornene, and one or more additives.

The EPDM-VNB copolymer can have a water content that varies widely. For example, the EPDM-VNB copolymer can have a water content from a low of about 0 wt. %, about 0.5 wt. %, or about 1 wt. %, to a high of about 50 wt. %, about 70 wt. %, or about 90 wt. %. In another example, the EPDM-VNB copolymer can have a water content of less than 5 wt. %, less than 2 wt. %, or less than 1 wt. %. In another example, the EPDM-VNB copolymer can have a water content from about 0 wt. % to about 90 wt. %, 0.1 wt. % to about 10 wt. %, 0.5 wt. % to about 10 wt. %, about 2 wt. % to about 20 wt. %, about 5 wt. % to about 60 wt. %, about 15 wt. % to about 25 wt. %, about 17 wt. % to about 54 wt. %, about 30 wt. % to about 54 wt. %, about 33 wt. % to about 48 wt. %, about 51 wt. % to about 54 wt. %, or about 50 wt. % to about 60 wt. %. In another example, the EPDM-VNB copolymer can be free of water. The weight percent of the water in the EPDM-VNB copolymer can be based on the total weight of the EPDM-VNB copolymer, or based on the total weight of the one or more ethylene, the one or more propylene one or more vinyl norbornene monomers, and one or more additives.

In one or more embodiments, the method of making EPDM-VNB copolymers can include, but are not limited to: adding a solvent to a reactor; adding a propylene and a catalyst mixture to the solvent in the reactor to make a first reaction mixture; contacting an ethylene to the first reaction mixture to make a second reaction mixture; and contacting a vinyl norbornene to the second reaction mixture to make a copolymer. In an embodiment, the method of making EPDM-VNB copolymers can include, but is not limited to: one or more reaction vessels, one or more short stops, one or more flash tanks, one or more wash mixers, one or more wash tanks, one or more wiped-film evaporator. In an embodiment, the method can reduce and/or inhibit premature cross-linking in the reactor. In another embodiment, the EPDM-VNB copolymer can substantially cross-link on final formulation.

In an embodiment, the method of making EPDM-VNB copolymers can include, but is not limited to: starting solvent flow to a reactor; agitating reactor contents; increasing pressure in the reactor; increasing the temperature of the contents in the reactor; adding a cocatalyst to the reactor; adding propylene to the reactor; adding hydrogen to the reactor; adding ethylene to the reactor; reducing flowrate of propylene; adding a catalyst mixture to reactor; adjusting ethylene and propylene flow to reactor; measuring reactor contents for percent solids; when percent solids are greater than 3.0, add vinyl norbornene; analyzing the polymer by taking a sample from the reactor and testing for VNB weight percent and ethylene:propylene ratio; and continuing to adjust the VNB solution flow rate until the desired VNB composition is achieved. In an embodiment, the reaction can include, but is not limited to: a polymerization reaction.

In an embodiment, the method of making EPDM-VNB copolymer can include a preparation of a catalyst mixture. The catalyst mixture can include, but is not limited to: one or more catalyst, one or more cocatalysts, one or more catalyst reactivators, and one or more solvents. In an embodiment, the catalyst mixture can be prepared by diluting 211 grams (1.1 moles) of co-catalyst number 2 in 830 grams of toluene at 35° C. To this diluted solution add 3.04 grams (3.78 mmoles) of co-catalyst number 1 and stir to give a clear homogeneous solution. Add 1.5 grams (3.82 mmoles) of metallocene complex to the co-catalyst mixture and stir to give a clear yellow to amber homogeneous solution having a metallocene complex concentration of 0.001435 grams of metallocene per gram of solution.

In an embodiment, the method of making EPDM-VNB copolymers can include a one-pot synthesis or a multi-batch synthesis. For example, the method of making EPDM-VNB copolymers can include a first reactor, second reactor, third reactor, fourth reactor, and more reactors. In another example, method of making EPDM-VNB copolymers can include reactors in a series or reactors in parallel.

FIG. 1 shows a method for making the EPDM-VNB copolymers. In an embodiment, a second reactor run in a series, as shown in FIG. 1. The reaction flowchart employs a solvent that serves as a reaction medium and monomer carrier. The solvent can be charged to a reactor to bring it to an operating pressure of about 190 to about 250 psig. The solvent can be stirred in the reactor at 700 to 1,500 rpm. Then, hydrogen and excess propylene can be introduced to the reactor via the solvent supply stream. The reactor can be brought to an operating temperature and the catalyst reactivator, co-catalyst, and catalyst can be introduced to the reactor by separate supply streams. Once the system is stable, ethylene can be introduced in increments via the solvent stream to initiate polymerization, resulting in production of an EPDM copolymers. Once the EPDM copolymers reaches a desired ethylene:propylene ratio, the vinyl norbornene can be introduced at a flow rate to make an EPDM-VNB copolymer of a desired ethylene:propylene: VNB ratio. The reagent flows can be adjusted, to give a reactor residence time, such as about 30 minutes; after which, the polymer/hexanes solution can be removed from the reactor and washed to remove any catalyst mixture residue. The washed EPDM-VNB copolymers can then introduced to a wiped-film evaporator, which removes the solvent from the low molecular weight liquid EPDM-VNB copolymer product. In an embodiment, a rotary evaporator can be used. In another embodiment, a second reactor can be connected in a series, as shown in FIG. 1.

The addition of solvent, such as hexanes, to the reactor can have a flow rate that varies widely. For example, the addition of solvent to the reactor can have a flow from a low of about 1.0 gram/minute, about 2.0 grams/minute, or about 5.0 grams/minute, to a high of about 60.0 grams/minute, about 80.0 grams/minute, or about 100.0 grams/minute. In another example, the addition of solvent to the reactor can have a flow from about 1.0 grams/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/ minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute. In an embodiment, the addition of the ethylene, propylene, vinyl norbornene, catalyst, cocatalyst, catalyst reactivator, and/or additives to the first reaction mixture or second reaction mixture can be added with the solvent.

The addition of ethylene to the reactor can have a flow rate that varies widely. For example, the addition of ethylene to the reactor can have a flow from a low of about 1.0 gram/minute, about 2.0 grams/minute, or about 5.0 grams/minute, to a high of about 60.0 grams/minute, about 80.0 grams/minute, or about 100.0 grams/minute. In another example, the addition of ethylene to the reactor can have a flow from about 1.0 grams/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute. In an embodiment, the ethylene flow rate can be adjusted to obtain the desired ethylene:propylene ratio in the EPDM-VNB copolymer.

The addition of propylene to the reactor can have a flow rate that varies widely. For example, the addition of hexanes to the reactor can have a flow from a low of about 1.0 gram/minute, about 2.0 grams/minute, or about 5.0 grams/minute, to a high of about 60.0 grams/minute, about 80.0 grams/minute, or about 150.0 grams/minute. In another example, the addition of propylene to the reactor can have a flow from about 1.0 grams/minute to about 150.0 grams/minute, about 1.0 grams/minute to about 100.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute. In an embodiment, the propylene flow rate can be adjusted to obtain the desired ethylene:propylene ratio in the EPDM-VNB copolymer.

The addition of the catalyst to the reactor can have a flow rate that varies widely. For example, the addition of catalyst to the reactor can have a flow from a low of about 1.0 gram/minute, about 2.0 grams/minute, or about 5.0 grams/minute, to a high of about 60.0 grams/minute, about 80.0 grams/minute, or about 100.0 grams/minute. In another example, the addition of catalyst to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The addition of the cocatalyst to the reactor can have a flow rate that varies widely. For example, the addition of catalyst to the reactor can have a flow from a low of about 1.0 gram/minute, about 2.0 grams/minute, or about 5.0 grams/minute, to a high of about 60.0 grams/minute, about 80.0 grams/minute, or 100.0 about grams/minute. In another example, the addition of cocatalyst to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The addition of the catalyst reactivator to the reactor can have a flow rate that varies widely. For example, the addition of catalyst reactivator to the reactor can have a flow from a low of about 1.0 gram/minute, about 2.0 grams/minute, or about 5.0 grams/minute, to a high of about 60.0 grams/minute, about 80.0 grams/minute, or 100.0 about grams/minute. In another example, the addition of catalyst reactivator to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The addition of hydrogen to the reactor can have a flow rate that varies widely. For example, the addition of hydrogen to the reactor can have a flow from a low of about 1.0 standard liters per hour (SLPH), about 2.0 SLPH, or about SLPH, to a high of about 60.0 SLPH, about 80.0 SLPH, or about 150.0 SLPH. In another example, the addition of hydrogen to the reactor can have a flow from about 1.0 SLPH to about 150.0 SLPH, about 2.5 SLPH to about 3.0 SLPH, about 3.0 SLPH to about 3.5 SLPH, about 3.5 SLPH to about 4.0 SLPH, about 4.0 SLPH to about 20.0 SLPH, about 5.0 SLPH to about 6.0 SLPH, about 6.0 SLPH to about 9.0 SLPH, about 8.0 SLPH to about 12.0 SLPH, about 20.0 SLPH to about 40.0 SLPH, about 25.0 SLPH to about 65.0 SLPH, about 45.0 SLPH to about 50.0 SLPH, or about 45.0 SLPH to about 55.0 SLPH. In another example, the addition of hydrogen to the reactor can have a flow from a low of about 1.0 gram/minute, about 2.0 grams/minute, or 150 about grams/minute, to a high of about 60.0 grams/minute, about 80.0 grams/minute, or about 100.0 grams/minute. In another example, the addition of hydrogen to the reactor can have a flow from about 1.0 gram/minute to about 99.0 grams/minute, about 2.5 grams/minute to about 3.0 grams/minute, about 3.0 grams/minute to about 3.5 grams/minute, about 3.5 grams/minute to about 4.0 grams/minute, about 4.0 grams/minute to about 20.0 grams/minute, about 5.0 grams/minute to about 6.0 grams/minute, about 6.0 grams/minute to about 9.0 grams/minute, about 8.0 grams/minute to about 12.0 grams/minute, about 20.0 grams/minute to about 40.0 grams/minute, about 25.0 grams/minute to about 65.0 grams/minute, about 45.0 grams/minute to about 50.0 grams/minute, or about 45.0 grams/minute to about 55.0 grams/minute.

The first reaction mixture, second reaction mixture, and/or catalyst mixture can be reacted and/or stirred in an open container or a closed container. The first reaction mixture, second reaction mixture, and catalyst mixture can be reacted and/or stirred under a vacuum. The first reaction mixture, second reaction mixture, and/or catalyst mixture can be reacted and/or stirred under an inert atmosphere, such as He, Ne, $N_2$, and Ar.

In an embodiment, the first reaction mixture, second reaction mixture, and/or catalyst mixture can be reacted and/or stirred under a widely varying gauge pressure. For example, the first reaction mixture, second reaction mixture, and catalyst mixture can be reacted and/or stirred under a gauge pressure from a low of about 0.1 psig, about 1 psig, or about 5 psig, to a high of about 50 psig, about 90 psig, or about 300 psig. In another example, first reaction mixture and second reaction mixture can be reacted and/or stirred under a gauge pressure from about 30 psig to about 85 psig, about 0.1 psig to about 90 psig, about 0.1 psig to about 1 psig, about 1 psig to about 85 psig, about 20 psig to about 90 psig, about 5 psig to about 20 psig, about 25 psig to about 75 psig, about 50 psig to about 175 psig, about 55 psig to about 235 psig, or about 0.1 psig to about 300 psig.

The first reaction mixture, second reaction mixture, and/or catalyst mixture can be agitated and/or stirred. For example, first reaction mixture, second reaction mixture, and catalyst mixture can be stirred from about 50 revolution per minute (rpm) to about 1,500 rpm, about 50 rpm to about 500 rpm, or about 60 rpm to about 1,000 rpm.

The first reaction mixture, second reaction mixture, and/or catalyst mixture can have a viscosity that can vary widely. For example, the first reaction mixture, second reaction mixture, and/or catalyst mixture can have a viscosity from a low of about 100 cP, about 1,000 cP, or about 100,000 cP, to a high of about 250,000 cP, about 900,000 cP, or about 2,500,000 cP. In another example, the first reaction mixture and second reaction mixture can have a viscosity from about 100 cP to about 2,500,000 cP, about 1,000 cP to about 250,000 cP, about 2,500 cP to about 250,000 cP, about 2,500 cP to about 2,500,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the first reaction mixture, second reaction mixture, and/or catalyst mixture can be measured on a Brookfield viscosimeter. The viscosity of the first reaction mixture, second reaction mixture, and/or catalyst mixture can be measured at various temperatures, such as 25° C., 40° C., 60° C., and 100° C.

The pH of the first reaction mixture, second reaction mixture, and/or catalyst mixture can vary widely. For example, first reaction mixture and second reaction mixture can have a pH from about 4.0 to about 12.0, about 5.0 to about 10.0, about 7.5 to about 11.0, about 7.0 to about 10.0, about 8.0 to about 9.0, about 9.0 to about 10.0, about 8.0 to about 10.0, about 9.0 to about 11.0, or about 6.0 to about 9.0.

The first reaction mixture, second reaction mixture, and/or catalyst mixture can be heated to a temperature from a low of about 0° C., about 15° C., and about 25° C., to a high of about 35° C., about 65° C., and about 200° C. For example, the first reaction mixture, second reaction mixture, and/or catalyst mixture can be heated to a temperature from about 25° C. to about 28° C., about 25° C. to about 35° C., about 25° C. to about 90° C., about 25° C. to about 45° C., about 40° C. to about 90° C., about 43° C. to about 78° C., about 40° C. to about 90° C., about 100° C. to about 200° C. In another example, the first reaction mixture, second reaction mixture, and/or catalyst mixture can be at room temperature. In another example, the reaction occurs at a temperature of greater than about 40° C. or greater than about 50° C. The first reaction mixture, second reaction mixture, and/or catalyst mixture can be performed at different temperatures.

The first reaction mixture can be reacted and/or stirred for a first reaction time from a short of about 15 s, about 120 s, or about 300 s, to a long of about 1 h, about 24 h, or about 72 h. For example, the first reaction time can be from about 1 min to about 15 min, about 5 min to about 45 min, about 1 h to about 7 h, about 1 h to about 12 h, about 5 h to about 15 h, about 10 h to about 24 h, about 12 h to about 17 h, about 12 h to about 24 h, about 22 h to about 50 h, or about 24 h to about 72 h.

The second reaction mixture can be reacted and/or stirred for a second reaction time from a short of about 15 s, about 120 s, or about 300 s, to a long of about 1 h, about 24 h, or about 72 h. For example, the second reaction time can be from about 1 min to about 15 min, about 5 min to about 45 min, about 1 h to about 7 h, about 5 h to about 15 h, about 10 h to about 24 h, about 12 h to about 17 h, about 12 h to about 24 h, about 22 h to about 50 h, or about 24 h to about 72 h.

The catalyst mixture can be reacted and/or stirred for a second reaction time from a short of about 15 s, about 120 s, or about 300 s, to a long of about 1 h, about 24 h, or about 72 h. For example, the catalyst mixture time can be from about 1 min to about 15 min, about 5 min to about 45 min, about 1 h to about 7 h, about 1 h to about 12 h, about 5 h to about 15 h, about 10 h to about 24 h, about 12 h to about 17 h, about 12 h to about 24 h, about 22 h to about 50 h, or about 24 h to about 72 h.

In one or more embodiments, the EPDM-VNB copolymers can be used in wide variety of commercial products. For example, the EPDM-VNB copolymers can be used in coatings, roof coatings, adhesives, liquid injection molding (LIM), additive manufacturing (3D Printing), binders for heat conducting/dissipating electronic materials, lubes, gear oils, greases, caulks, oil additives, high hardness compounds, reactive plasticizers, and polymer modification applications.

EXAMPLES

To provide a better understanding of the foregoing discussion, the following non-limiting examples are offered. Although the examples can be directed to specific embodiments, they are not to be viewed as limiting the invention in any specific respect.

A continuous production of liquid EPDM-VNB copolymers using a Ziegler-Natta catalyst were performed to show the varying the ethylene:propylene ratios and vinyl norbornene content in the EPDM-VNB copolymers while keeping the polymer in liquid form with low molecular weight. The continuous production of liquid EPDM-VNB copolymers using Ziegler-Natta catalysts are shown in Examples 1-10.

The reagents for continuous production of liquid EPDM-VNB copolymers using a Ziegler-Natta catalyst were: ethyl aluminum sesqui chloride (EASC), co-catalyst; vanadium oxytrichloride ($VOCl_3$), catalyst; dichlorophenylacetic acid ethyl ester (DCPAE), catalyst reactivator; hexane (reaction medium); the monomers ethylene, propylene, vinyl norbornene solution in hexane; and hydrogen.

The Ziegler-Natta catalyst mixture was prepared by the following: EASC solution prepared by diluting with dry hexane to give a solution having concentration equal to 0.105 grams/gram of solution; VOCl₃ solution prepared by diluting with dry hexane to give a solution having concentration equal to 0.004667 grams/gram of solution; and DCPAE solution prepared by diluting with dry hexane to give a solution having concentration equal to 0.021 grams/gram of solution. The active catalyst is generated in situ when all components are added to the reactor.

The following is the continuous polymerization procedure for the examples using a Ziegler-Natta catalyst: Start solvent (hexane) flow to a 5.6-liter reactor at 100 grams/minute (6000 grams/hour); Adjust agitation to 1000 revolutions per minute (rpm); Bring the reactor pressure to 200 psig; Adjust the reactor temperature to 40° C.; Add EASC solution to the reactor at a flow rate of 150 grams/hour; Start propylene flow to the reactor at 15 g/min. and neat hydrogen at 6.5 Standard Liters Per Hour (SLPH); Add VOCL3 solution to the reactor at 120 g/min; Add DCPAE solution to the reactor at 120 g/min; After a total of 300 grams of propylene has been passed through the reactor start the ethylene flow at 1.0 g/min; After 5 minutes adjust ethylene flow to the reactor from 1.0 to 2.5 grams/minute and hold for 3 minutes; After three minutes adjust ethylene flow to the reactor from 2.5 to 3.0 grams/minute to initiate polymerization (as indicated exothermic reaction in less than 5 minutes); Adjust ethylene flow from 3.0 to 3.5 grams/minute and hold for approximately 10 minutes; Adjust ethylene flow from 3.5 to 4.0 g/min. and increased propylene flow from 15.0 to 20.0 g/min; After 30 minutes, check reactor contents for percent solids (should be greater than 3.0%); When percent solids are greater than 3.0, initiate addition of vinyl norbornene solution at 1.4 grams/minute (84 g/h); Gradually increase the VNB solution flow over a one-hour time period until flow is 2.0 grams/minute (120 g/h); After one half hour, analyze the polymer by taking a sample from the reactor and testing for VNB weight percent and ethylene/propylene ratio; Continue to adjust the vinyl norbornene solution flow rate until the desired vinyl norbornene composition is achieved; Take reactor samples for analyses one-half hour after reaching each desired vinyl norbornene solution flow rate; and Adjustments to propylene flow rate will also be required to maintain the desired E:P ratio.

Table 1 shows the continuous polymerization reaction parameters using a Ziegler-Natta catalyst to produce liquid EPDM-VNB copolymers. The monomer flow rates are provided specifically for the reaction used in Example 1. The remaining examples varied the flow of monomers to achieve the desired ratios set forth below.

TABLE 1

Polymerization Reaction Conditions for Liquid EPDM-VNB for Example 1

| Reaction Parameter | |
|---|---|
| Reaction Temperature, ° C. | 40.5 |
| Reactor Pressure, psig | 200 |
| Agitation Speed, rpm | 1,000 |
| Reactivator/Catalyst Ratio | 5.0 |
| Cocatalyst Flow, g/h | 15.96 |
| Catalyst Flow, g/h | 0.5694 |
| Cocatalyst/Catalyst Ratio | 28.00 |
| VNB Flow, g/h | 17.46 |
| Ethylene Flow, g/h | 300 |
| Propylene Flow, g/h | 186 |
| Hydrogen Flow, slph | 5.0 |
| Hexane Flow, g/h | 6,000 |
| VNB/Catalyst Ratio | 30.63 |
| Ethylene/Catalyst Ratio | 526 |
| Percent Solids | 6.71 |
| Solvent Flow Rate, g/min | 101 |
| Residence Time, min | 30 |

Tables 2 and 3 show the EPDM-VNB copolymers properties of the ten example reactions conducted according to the reaction parameters set forth in Table 1 and using varying monomer content. For these experiments, samples were taken directly from the reactor to be analyzed without first having to be isolated as a solid polymer. The results show the development of a low molecular weight EPDM-VNB copolymers with high vinyl norbornene content.

TABLE 2

Example Liquid EPDM-VNB Copolymer Properties by Ziegler-Natta Catalyst Continuous Production

| Polymer Properties | Example 1 (Midpoint) | Example 2 | Example 3 | Example 4 (Midpoint) | Example 5 |
|---|---|---|---|---|---|
| C3, Mass % | 35.7 | 25.5 | 48.0 | 36.7 | 47.9 |
| VNB, Mass % | 2.5 | 1.6 | 1.6 | 2.8 | 5.4 |
| Oil Solution Viscosity at 5%, 100° C. (cST) | 8.54 | 7.67 | 8.41 | 8.40 | 11.8 |
| Brookfield Viscosity at 100° C. (cP) | 49,846 | 44,188 | 51,243 | 73,108 | 183,488 |
| $M_w$ (Da) | 18,687 | 16,566 | 19,211 | 27,408 | 68,789 |
| $M_n$ (Da) | 3,682 | 4,218 | 5,199 | 5,982 | 13,473 |
| PDI ($M_w/M_n$) | 5.1 | 3.9 | 3.7 | 4.6 | 5.1 |
| Wt. %, $M_w > 10^6$ (Da) | 0.0 | 0.1 | 0.0 | 0.3 | 0.4 |
| Wt. %, $M_w < 10^5$ (Da) | 96.8 | 98.0 | 98.4 | 95.4 | 84.9 |
| LCB/polymer | 1.47 | 1.34 | 0.53 | 1.36 | 1.77 |
| $T_g$ (° C.) | -60.0 | -49.0 | -64.5 | -57.9 | -54.6 |
| % Crystallinity | 2.9-3.1 | 10.7-13.3 | 0 | 2.6-3.2 | 0 |

TABLE 3

Example Liquid EPDM-VNB Copolymer Properties by
Ziegler-Natta Catalyst Continuous Production (Continued)

| Polymer Properties | Example 6 (crumb) | Example 7 (semi-solid) | Example 8 | Example 9 | Example 10 |
|---|---|---|---|---|---|
| C3, Mass% | 19.5 | 24.6 | 49.8 | 50.4 | 49.2 |
| VNB, Mass % | 6.0 | 5.1 | 6.6 | 8.0 | 10.4 |
| Oil Solution Viscosity at 5%, 100° C. (cST) | 23.62 | 13.60 | 7.81 | 9.99 | 9.78 |
| Brookfield Viscosity at 100° C. (cP) | 666,418 | 2,483,157 | 82,356 | 170,265 | 133,791 |
| $M_w$ (Da) | 249,838 | 930,928 | 30,875 | 63,832 | 50,158 |
| $M_n$ (Da) | 8,604 | 45,879 | 8,382 | 20,795 | 14,479 |
| PDI ($M_w/M_n$) | 29.0 | 20.3 | 3.7 | 3.1 | 3.5 |
| Wt. %, $M_w >$ $10^6$ (Da) | 8.1 | 13.1 | 0.5 | 0.2 | 0.6 |
| Wt. %, $M_w <$ $10^5$ (Da) | 72.1 | 51.4 | 95.7 | 85.2 | 89.9 |
| LCB/polymer | 8.12 | 6.42 | 1.61 | 1.03 | 0.72 |
| $T_g$ (° C.) | −33.6 | −43.4 | −54.9 | −48.6 | −47.3 |
| % Crystallinity | 10.3-14.4 | 7.8-12.4 | 0 | 0 | 0 |

The results of the experiments show that it was possible to add VNB to the liquid EPDM polymers above 3.0 wt. % while keeping the polymer in a liquid phase. The ability for the vinyl norbornene monomers to incorporate into the polymer chains while keeping the polymer in liquid form has an inverse relationship with the ethylene content in the polymer. Hence, a greater amount of the propylene monomers incorporating into the EPDM polymer chain inhibits the tendency of the vinyl norbornene monomer to form long-chain branches in the polymer chain and increase the molecular weight. Conversely, when ethylene monomers have higher incorporation rate in the EPDM-VNB copolymer, it causes an increase in long-chain branching and the molecular weight of the EPDM-VNB copolymer.

Table 4 shows the vinyl norbornene content of the EPDM-VNB copolymers made by a continuous process using a Ziegler-Natta catalyst at various vinyl norbornene solution flow rates. The propylene flow rates were adjusted to maintain propylene between 49 and 55 in the ethylene:propylene weight ratio.

TABLE 4

Control of the Vinyl Norbornene Content
in the EPDM-VNB Copolymer

| Sample | VNB solution flow grams/hour | VNB wt. % in polymer | Propylene Flow, grams/hour | Propylene in E:P Ratio |
|---|---|---|---|---|
| 1 | 84 | 4.5 | 542 | 51 |
| 2 | 118 | 5.5 | 516 | 51.9 |
| 3 | 136 | 5.8 | 595 | 51.4 |
| 4 | 142 | 6.0 | 581 | 52.0 |
| 5 | 144 | 6.4 | 585 | 51.9 |
| 6 | 152 | 7.4 | 564 | 50.5 |
| 7 | 156 | 8.0 | 553 | 49.4 |

Next, a continuous production of liquid EPDM-VNB copolymers using a metallocene catalyst were performed to show the varying ethylene:propylene ratios and vinyl norbornene content in the EPDM-VNB copolymers while keeping the copolymer in liquid form with low molecular weight. The continuous production of liquid EPDM-VNB copolymers using a metallocene catalyst are shown in Examples 11-15.

The reagents for continuous production of liquid EPDM-VNB copolymers using a metallocene catalyst were: tri-isobutyl aluminum (TIBA) solution in hexane, 0.0238 gram/gram of solution; bis(indenyl) zirconium dichloride (metallocene complex); N,N-dimethylanilinium tetrakis (pentafluorophenyl) borate (co-catalyst number 1); methylaluminoxane (MAO), 30% in toluene (co-catalyst number 2); toluene (catalyst solvent); hexane (reaction medium); the monomers ethylene, propylene, and vinyl norbornene in hexane at 75 wt. %; and hydrogen.

The metallocene complex catalyst mixture was prepared by the following: The catalyst was prepared by diluting 211 grams (1.1 moles) of co-catalyst number 2 in 830 grams of toluene at 35° C. To this diluted solution add 3.04 grams (3.78 mmoles) of co-catalyst number 1 and stir to give a clear homogeneous solution. Add 1.5 grams (3.82 mmoles) of metallocene complex to the co-catalyst mixture and stir to give a clear yellow to amber homogeneous solution having a metallocene complex concentration of 0.001435 grams of metallocene per gram of solution.

The following is the continuous polymerization procedure for the examples using a metallocene complex catalyst: Started hexane (solvent) flow to a 5.6-liter reactor at 50 g/minute (3000 g/h); Adjusted agitation to 1,000 revolutions per minute (rpm); Brought the reactor pressure to 200 psig; Adjusted the reactor temperature to 50° C.; Added tri-isobutyl aluminum (TIBA) to the reactor at a flow rate of 20 g/h, then reduce the flow to 10 g/h (continue at this flow rate for 30 minutes to dry the reactor); Started propylene flow to reactor at 15 g/min. and neat hydrogen at 1.5 Standard Liters Per Hour (SLPH); Introduced ethylene to the reactor at 1.0 g/min; After a total of 300 grams of propylene has been passed through the reactor the flow rate is reduced to 6.0 g/min; Started catalyst mixture flow to reactor with a dose of 50 g of solution, then adjusted catalyst flow rate to 55 g/hr; Adjusted ethylene flow to reactor from 1.0 to 2.5 g/min. and hold for 3 mins; After three minutes adjust ethylene flow to the reactor from 2.5 to 3.0 g/min. to initiate polymerization (as indicated exothermic reaction in less than 5 minutes); Adjusted ethylene flow from 3.0 to 3.5 g/min. and hold for approximately 10 minutes; Adjusted ethylene flow from 3.5 to 4.0 g/min. and increased propylene flow from 6.0 to 9.0 g/min; Measured reactor contents for percent solids (should be greater than 3.0%); When percent solids are greater than 3.0, initiate addition of VNB solution at 0.83 g/min; Gradually increased the VNB solution flow over a one-hour time period until flow is 2.0 g/minute (120 g/hr); After one half hour, analyzed the polymer by taking a sample from the reactor and testing for VNB weight percent and ethylene:propylene ratio; Continued to adjust the VNB solution flow rate until the desired VNB composition is achieved; Took reactor samples for analyses one-half hour after reaching each desired VNB solution flow rate; and Adjusted the propylene flow rate will also be required to maintain the desired E:P ratio.

Table 5 shows the continuous polymerization reaction parameters using a metallocene catalyst to produce liquid EPDM-VNB copolymers. The monomer flow rates are provided specifically for the reaction used in Example 11. The remaining examples varied the flow of monomers to achieve the desired ratios set forth below.

TABLE 5

Polymerization Reaction Conditions for Liquid EPDM-VNB for Example 11

| Reaction Parameter | |
| --- | --- |
| Reaction Temperature, ° C. | 50 |
| Reactor Pressure, psig | 200 |
| Agitation Speed, rpm | 1,000 |
| Cocatalyst 1/Catalyst Ratio | 1.0 |
| Cocatalyst 3 (TIBA) Flow, g/h | 20.0 |
| Catalyst Flow (neat), g/h | 0.0715 |
| Cocatalyst 2 (MAO)/Catalyst Ratio | 288 |
| VNB (solution) Flow, g/h | 120 |
| Ethylene Flow, g/h | 240 |
| Propylene Flow, g/h | 540 |
| Hydrogen Flow, SLPH | 1.5 |
| Hexane Flow, g/h | 3,000 |
| VNB/Catalyst Ratio | 1678 |
| Ethylene/Catalyst Ratio | 3357 |
| Percent Solids | 15.0 |
| Solvent Flow Rate, g/min | 60 |
| Residence Time, min | 30 |

Table 6 shows the EPDM-VNB copolymers and their properties made by a continuous production of the copolymer using a metallocene catalyst.

TABLE 6

Example Liquid EPDM-VNB Copolymer Properties by Metallocene Catalyst Continuous Production

| Polymer Properties | Example 11 | Example 12 | Example 13 | Example 14 | Example 15 |
| --- | --- | --- | --- | --- | --- |
| C3, Mass % | 48.7 | 47.5 | 46.3 | 44.0 | 46.0 |
| VNB, Mass % | 4.0 | 7.3 | 8.6 | 9.6 | 8.8 |
| Oil Solution Viscosity at 5%, 100° C. (cST) | 4.94 | 5.26 | 6.66 | 7.19 | 8.11 |
| Brookfield Viscosity at 100° C. (cP) | 13,721 | 24,994 | 86,194 | 125,032 | 173,533 |
| $M_w$ (Da) | 5,144 | 9,370 | 32,314 | 46,874 | 65,057 |
| $M_n$ (Da) | 1,264 | 1,747 | 3,065 | 3,447 | 2,663 |
| PDI (Mw/Mn) | 4.07 | 5.36 | 10.54 | 13.60 | 24.4 |
| Wt %, $M_w > 10^6$ (Da) | 0.02 | 0.22 | 0.10 | 0.44 | N/A |
| Wt %, $M_w < 10^5$ (Da) | 99.8 | 99.3 | 94.2 | 91.4 | N/A |
| LCB/polymer | N/A | N/A | 8.99 | 14.96 | 9.91 |
| $T_g$ (° C.) | −70.3 | −60.4 | −52.7 | −50.5 | −52.9 |
| % Crystallinity | <1.0 | <1.0 | <1.0 | <1.0 | <1.0 |

Table 7 shows the vinyl norbornene content of the EPDM-VNB copolymers made by a continuous process using a metallocene catalyst at various vinyl norbornene solution flow rates. The propylene flow rates were adjusted to maintain propylene between 49 and 55 in the ethylene:propylene weight ratio.

TABLE 7

Vinyl Norbornene Content in the EPDM-VNB Copolymer

| Sample | VNB solution flow grams/hour | VNB wt. % in polymer | Propylene Flow, grams/hour | E:P Ratio |
| --- | --- | --- | --- | --- |
| 1 | 90 | 1.5 | 552 | 45/55 |
| 2 | 116 | 3.8 | 648 | 50/50 |
| 3 | 120 | 4.8 | 1,050 | 51/49 |
| 4 | 190 | 6.8 | 690 | 43/57 |
| 5 | 216 | 7.3 | 750 | 48/52 |
| 6 | 242 | 8.8 | 900 | 51/49 |
| 7 | 294 | 9.7 | 1140 | 49/51 |

Examples 1-15 show that low molecular weight liquid EPDM-VNB copolymers can be made with both Ziegler-Natta and metallocene catalysts in continuous production processes. Careful selection of the catalyst mixture can allow production of a broad range of liquid VNB-based EPDM polymers.

Finally, batch production of liquid EPDM-VNB copolymer using a metallocene catalyst were performed to show the varying ethylene:propylene ratios and vinyl norbornene content in the EPDM-VNB copolymers while keeping the polymer in liquid form with low molecular weight. The batch production of liquid EPDM-VNB copolymers using a metallocene catalyst are shown in Examples 16-19.

The batch production polymerization reactions were carried out in a 4.0-liter batch reactor by charging the reactor with 1,800 grams of hexane followed by bringing the reactor to operating temperature. The reactor was then charged with monomers propylene, ethylene, and hydrogen if used. Catalyst and co-catalyst were added to initiate polymerization. Shortly after initiation of polymerization the specified amount of vinyl norbornene was added and the reaction allowed to proceed for the specified time. At the end of the reaction the polymer was removed and analyzed for physical properties.

Table 8 shows the batch polymerization reaction parameters using a metallocene catalyst to produce liquid EPDM-VNB copolymers.

polymerization using Ziegler-Natta and metallocene catalyst systems are shown in FIGS. 2-6.

Figure 2:
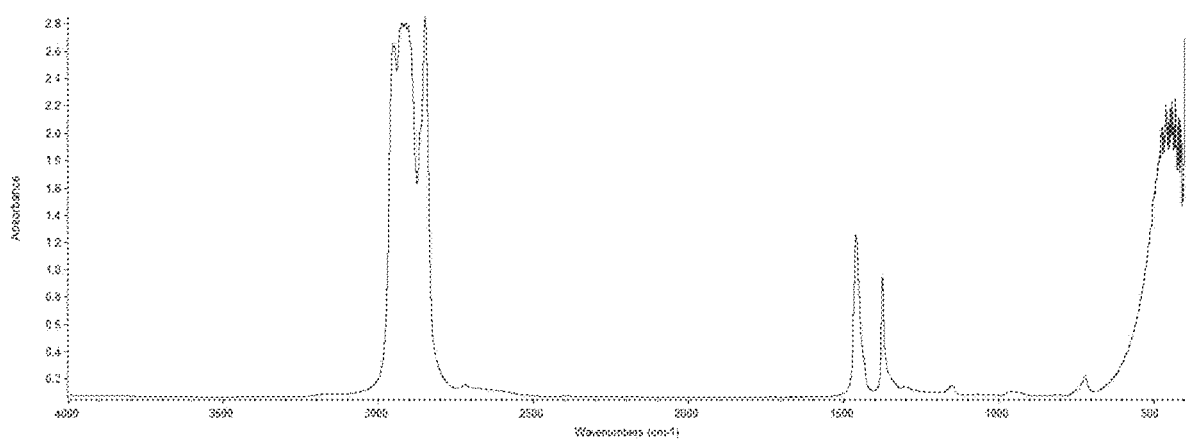
FIG. 2 is an infrared spectrum (IR) of an EPDM-VNB copolymer prepared with ZN catalyst system shows the absence of terminal unsaturation at 890 $cm^{-1}$ (VNB=0).
Figure 3:
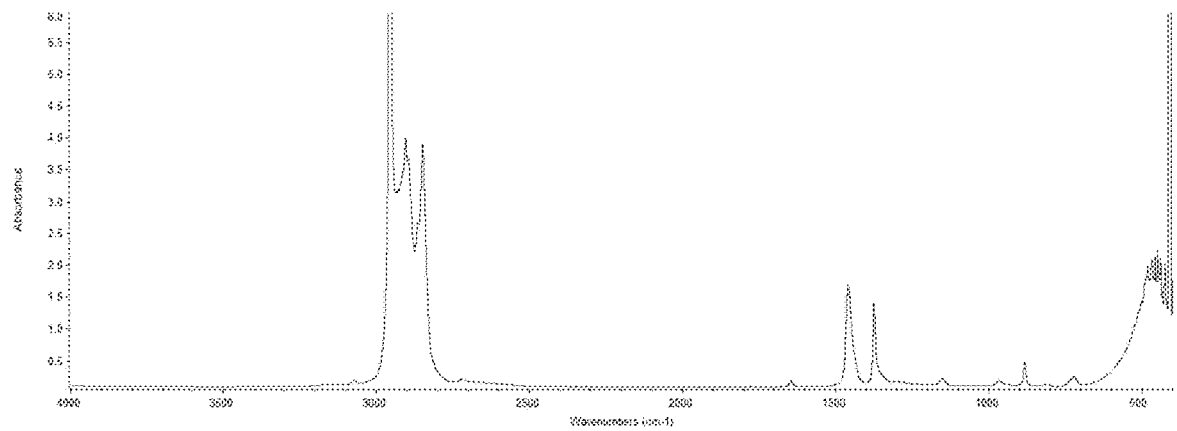
FIG. 3 is an infrared spectrum of an EPDM-VNB copolymer prepared with metallocene catalyst system shows the presence of terminal unsaturation at 890 $cm^{-1}$ (VNB=0).

FIG. 2 shows the spectrum of a liquid EPDM-VNB copolymers produced with Ziegler-Natta catalyst. The absence of absorbance at 890 $cm^{-1}$ indicates that polymer chain termination is saturated. FIG. 3 shows the spectrum of a liquid EPDM-VNB copolymers produced with a metallocene catalyst; the presence of absorbance at 890 $cm^{-1}$ is indicative of unsaturated polymer chain termination.

TABLE 8

Batch Reactor Preparation of Metallocene Catalyzed Liquid EPDM-VNB Copolymers

| Reaction Parameter | Example 16 | Example 17 | Example 18 | Example 19 |
|---|---|---|---|---|
| Reaction Temperature, ° C. | 70 | 70 | 70 | 70 |
| Reactor pressure, KPa (psig) | 70 | 70 | 70 | 70 |
| Agitation speed, rpm | 1,500 | 1,500 | 1,500 | 1,500 |
| Catalyst | 5036* | 5036 | 5036 | 5036 |
| Co-catalyst 1 | B1* | B1 | B1 | B1 |
| Co-catalyst 2 | MAO* | MAO | MAO | MAO |
| Co-catalyst 1/Catalyst Molar Ratio | 1/1 | 1/1 | 1/1 | 1/1 |
| Co-catalyst 2/Catalyst Molar Ratio | 500/1 | 500/1 | 500/1 | 500/1 |
| Catalyst, g | 0.02 | 0.024 | 0.024 | 0.024 |
| VNB, g | 17 | 25 | 25 | 25 |
| Ethylene Flow, g/min | 8.1 | 8.4 | 5.5 | 4.1 |
| Propylene Flow, g/min | 14.1 | 13.4 | 11.7 | 11.8 |
| Solvent, g | 1,800 | 1,800 | 1,800 | 1,800 |
| Hydrogen (psig) | 10 | 30 | 36.5 | 37.5 |
| Run time, min | 10 | 10 | 10 | 10 |

*Ethylene bis(indenyl) zirconium dichloride (Eurecene 5036) from Lanxess, mol. wt. = 418.47 g/mol; B1 =N,N-Dimethyl-anilinium tetrakis(pentaflourophenyl) borate from W.R. Grace; MAO = Methylaluminoxane from W.R. Grace.

Table 9 shows the EPDM-VNB copolymers and their properties made by a batch production of the copolymer using a metallocene catalyst.

TABLE 9

Example Liquid EPDM-VNB Copolymer Properties by Metallocene Catalyst Batch Process

| Polymer Properties | Example 16 | Example 17 | Example 18 | Example 19 |
|---|---|---|---|---|
| C3, Mass % | 48.6 | 46.0 | 43.7 | 46.8 |
| VNB, Mass % | 4.6 | 6.3 | 8.9 | 8.9 |
| Oil Solution Viscosity at 5%, 100° C. (cST) | 6.59 | 5.65 | 5.14 | 5.10 |
| Brookfield Viscosity at 100° C. (cP) | 116,080 | 37,802 | 26,551 | 24,423 |
| Mw (Da) | 43,518 | 14,172 | 9,954 | 9,531 |
| Mn (Da) | 4,178 | 2,794 | 2,068 | 2,086 |
| PDI (Mw/Mn) | 10.42 | 5.07 | 4.81 | 4.57 |
| Wt. %, Mw > $10^6$ (Da) | 0.68 | 0.33 | 0.56 | 0.25 |
| Wt. %, Mw < $10^5$ (Da) | 91.9 | 98.5 | 98.6 | 99.1 |
| LCB/polymer | 7.61 | N/A | N/A | N/A |
| $T_g$ (° C.) | −54.5 | −54.5 | −54.8 | −50.7 |
| % Crystallinity | <1.0 | <1.0 | <1.0 | <1.0 |

Figure 4:
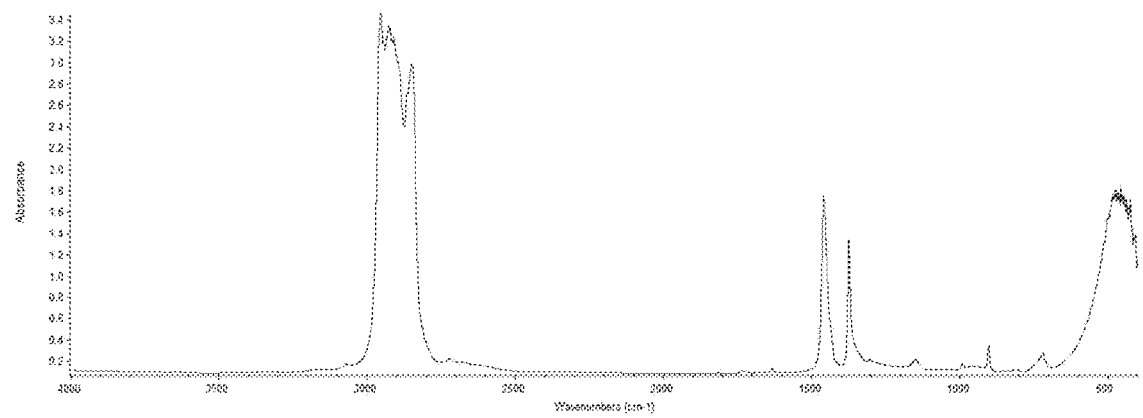
FIG. 4 is an infrared spectrum a liquid ethylene/propylene/vinyl norbornene terpolymer prepared with ZN catalyst system shows absence of terminal unsaturation at 890 $cm^{-1}$ and the presence of VNB unsaturation at 900 $cm^{-1}$ (VNB=5.11).
Figure 5:
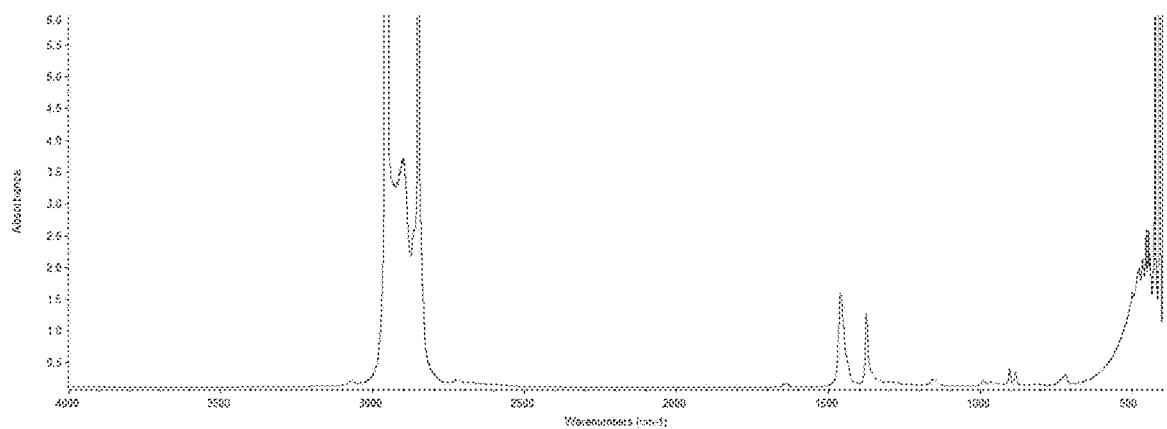
FIG. 5 is an infrared spectrum liquid EPDM-VNB copolymer prepared with metallocene catalyst system shows the presence of both terminal (890 $cm^{-1}$) and VNB (900 $cm^{-1}$) unsaturation (VNB=5.157).

Results show that liquid EPDM having significant amounts of vinyl norbornene can be produced in a batch process using metallocene catalyst systems. Depending on the metallocene catalyst selected, the liquid EPDM-VNB copolymers can be produced with terminal unsaturation (β-hydrogen elimination) in addition to pendant unsaturation provided by incorporation on VNB. Both types can be verified by Fourier Transform Infrared (FTIR) spectroscopy. Unsaturated terminal groups such as vinyl and vinylidene are indicated by absorption peaks at 890 $cm^{-1}$. FTIR spectra of liquid EPDM-VNB copolymers produced in continuous FIG. 4 shows a liquid EPDM-VNB copolymers produced with Ziegler-Natta catalyst having between 4 and 5 wt. % of VNB; the spectrum shows absorbance at 900 $cm^{-1}$ and none at 890 cm', indicating unsaturation provided by VNB and none by terminal unsaturation. FIG. 5 shows the spectrum of a liquid EPDM-VNB copolymers produced with metallocene catalyst and VNB content of 4 to 5 wt. %. The spectrum shows absorbance at 890 $cm^{-1}$ and 900 $cm^{-1}$ indicating unsaturation from VNB and O-hydrogen elimination. This feature, not seen in Ziegler-Natta produced samples, gives metallocene-based polymers the potential to undergo post reactions by way of internal pendant and terminal unsaturation.

Figure 6:
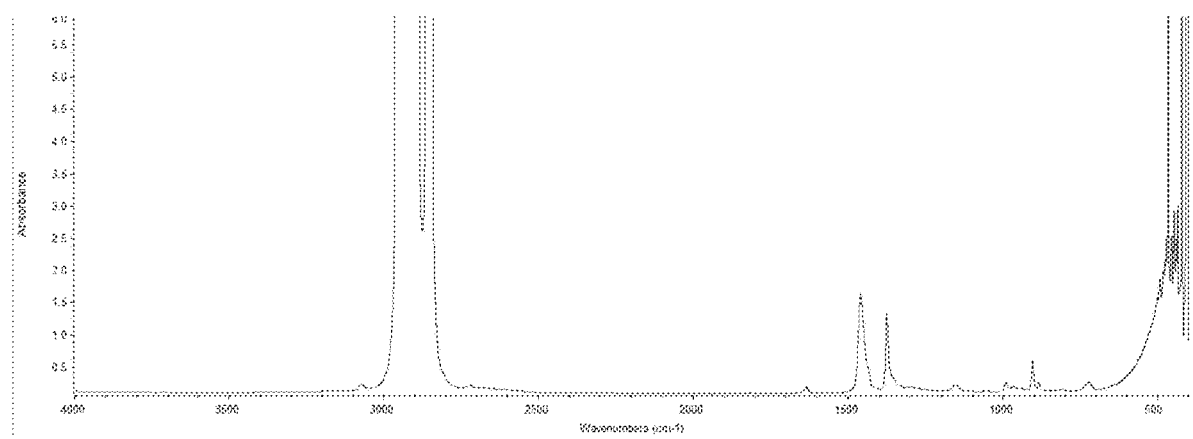
FIG. 6 is an infrared spectrum a liquid EPDM-VNB copolymer prepared with metallocene catalyst system having greater than 9.7 weight percent VNB (VNB=9.74).

FIG. 6 shows a liquid EPDM-VNB copolymers, produced with metallocene catalyst, having VNB content greater than 9.5 wt. %. As VNB weight percentages increase, the inherent unsaturation observed in the copolymer diminishes (compare to FIG. 5). Without wanting to be bound by theory, this suggests that the mechanism for chain termination is probably changing, possibly from a β-hydrogen transfer to a monomer (VNB) mechanism.

One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits may be the values from the examples. Certain lower limits, upper limits and ranges appear in at least one claims below. All numerical values are "about" or "approximately" the indicated value, and consider experimental error and variations that would be expected by a person having ordinary skill in the art.

What is claimed is:

1. A copolymer comprising:
ethylene;
propylene; and
vinyl norbornene, wherein the copolymer has a weight-average molecular weight from about 2,500 g/mol to about 1,000,000 g/mol, wherein the copolymer has a propylene content of at least 50 wt %, wherein a vinyl norbornene content of the copolymer is at least 8.0 wt % of the copolymer, and wherein the copolymer has a viscosity from about 1,000 cP to about 2,500,000 cP at 100° C.

2. The copolymer of claim 1, wherein the copolymer has an ethylene:propylene ratio from about 40:60 to about 80:20.

3. The copolymer of claim 1, wherein the copolymer has a number-average molecular weight of less than 50,000 g/mol.

4. The copolymer of claim 1, wherein the copolymer has an ethylene content from about 5 wt % to about 48 wt %.

5. The copolymer of claim 1, wherein the copolymer is a liquid at room temperature.

6. The method of making a copolymer comprising:
adding a solvent to a reactor;
adding a propylene and a catalyst mixture to the solvent in the reactor to make a first reaction mixture, wherein the catalyst mixture comprises: one or more catalysts, one or more cocatalysts, and one or more catalyst reactivators;
contacting ethylene with the first reaction mixture to make a second reaction mixture; and
contacting vinyl norbornene to the second reaction mixture to make a copolymer, wherein the copolymer has a weight-average molecular weight from about 2,500 g/mol to about 1,000,000 g/mol, wherein the copolymer has a propylene content of at least 50 wt. % wherein a vinyl norbornene content of the copolymer is at least 8.0 wt % of the copolymer, and wherein the copolymer has a viscosity from about 1,000 cP to about 2,500,000 cP at 100° C.

7. The method of claim 6, wherein the one or more catalysts is a Ziegler-Natta catalyst.

8. The method of claim 6, wherein the one or more catalysts is a metallocene complex.

9. The method of claim 6, wherein the one or more catalysts is vanadium oxytrichloride, wherein the one or more cocatalysts is ethyl aluminum sesquichloride, and wherein the one or more catalyst reactivators is dichlorophenylacetic acid ethyl ester.

10. The method of claim 6, wherein the one or more catalysts is bis(indenyl) zirconium dichloride, wherein the one or more cocatalysts comprises a first cocatalyst, a second cocatalyst, and a third cocatalyst, wherein the first cocatalyst is N,N-dimethylanilinium tetrakis(pentaflourophenyl) borate, wherein the second cocatalyst is methylaluminoxane, and the third cocatalyst is triisobutyl aluminum.

11. The method of claim 6, wherein the copolymer has an ethylene:propylene ratio from about 40:60 to about 80:20.

12. The method of claim 6, wherein adding propylene and the catalyst mixture to the solvent in the reactor to make a first reaction mixture has a propylene flow rate, wherein the propylene flow rate is about 1.0 gram/minute to about 100.0 grams/minute.

13. The method of claim 6, wherein the solvent is hexane.

14. The method of claim 6, wherein the copolymer has knumber-average molecular weight of less than 50,000 g/mol.

15. The method of claim 6, wherein the copolymer has a viscosity from about 1,000 cP to about 250,000 cP at 100° C.

16. The method of claim 6, wherein the copolymer has an ethylene content from about 5 wt. % to about 48 wt. %.

* * * * *